United States Patent
Husberg et al.

(10) Patent No.: US 12,472,799 B2
(45) Date of Patent: Nov. 18, 2025

(54) COMPUTER-IMPLEMENTED METHOD OF CONTROLLING THE CABIN CLIMATE IN A VEHICLE TRAVELLING ON A ROAD

(71) Applicant: VOLVO TRUCK CORPORATION, Gothenburg (SE)

(72) Inventors: Tobias Husberg, Kareby (SE); Mikael Askerdal, Åsa (SE); Olof Willstrand, Frillesås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 320 days.

(21) Appl. No.: 18/296,071

(22) Filed: Apr. 5, 2023

(65) Prior Publication Data
US 2023/0339289 A1 Oct. 26, 2023

(30) Foreign Application Priority Data
Apr. 21, 2022 (EP) .................................... 22169244

(51) Int. Cl.
*B60H 1/00* (2006.01)
(52) U.S. Cl.
CPC ..... *B60H 1/00771* (2013.01); *B60H 1/00785* (2013.01); *B60H 1/00885* (2013.01)
(58) Field of Classification Search
CPC ............ B60H 1/00771; B60H 1/00785; B60H 1/00885; B60H 2001/3266; B60H 1/3208; B60H 2001/00733; B60H 2001/3273; B60H 1/00735; B60H 1/00378; B60H 1/00428; B60H 1/00764; B60H 1/00821; B60H 1/00828; B60H 1/00878
See application file for complete search history.

(56) References Cited

U.S. PATENT DOCUMENTS

| | | | |
|---|---|---|---|
| 10,562,369 B2 | 2/2020 | Geller et al. | |
| 2013/0345930 A1 | 12/2013 | Blumenstock et al. | |
| 2017/0291605 A1* | 10/2017 | Grewal ................. | B60W 30/14 |
| 2018/0334012 A1* | 11/2018 | Geller ................ | B60H 1/00428 |

(Continued)

FOREIGN PATENT DOCUMENTS

| | | | | |
|---|---|---|---|---|
| DE | 102012006325 A1 | 11/2012 | | |
| WO | WO-2017100613 A1 * | 6/2017 | ............ | B60W 20/14 |
| WO | 2020142066 A1 | 7/2020 | | |

OTHER PUBLICATIONS

European Search Report dated Oct. 14, 2022 in corresponding European Patent Application No. 22169244.5, 7 pages.

*Primary Examiner* — Scott A Browne
(74) *Attorney, Agent, or Firm* — Venable LLP; Jeffri A. Kaminski

(57) ABSTRACT

The invention relates to a computer-implemented method of controlling the cabin climate in a vehicle travelling on a road. A requested temperature value of a desired temperature for at least one part of the cabin is detected. An allowable temperature deviation from the requested temperature value is determined. Topographic data representative of the topography of an upcoming road segment is acquired. A flow creating device of an air-conditioning system of the vehicle is controlled based on the acquired topographic data so as to maintain the temperature within the allowable deviation. The invention also relates to a computer program, to a computer readable medium, to a control unit and to a vehicle.

13 Claims, 4 Drawing Sheets

(56) References Cited

U.S. PATENT DOCUMENTS

2018/0361823 A1* 12/2018 Igarashi ............ B60H 1/00771
2021/0247198 A1    8/2021 Korber et al.
2021/0309074 A1   10/2021 Mizuno et al.

* cited by examiner

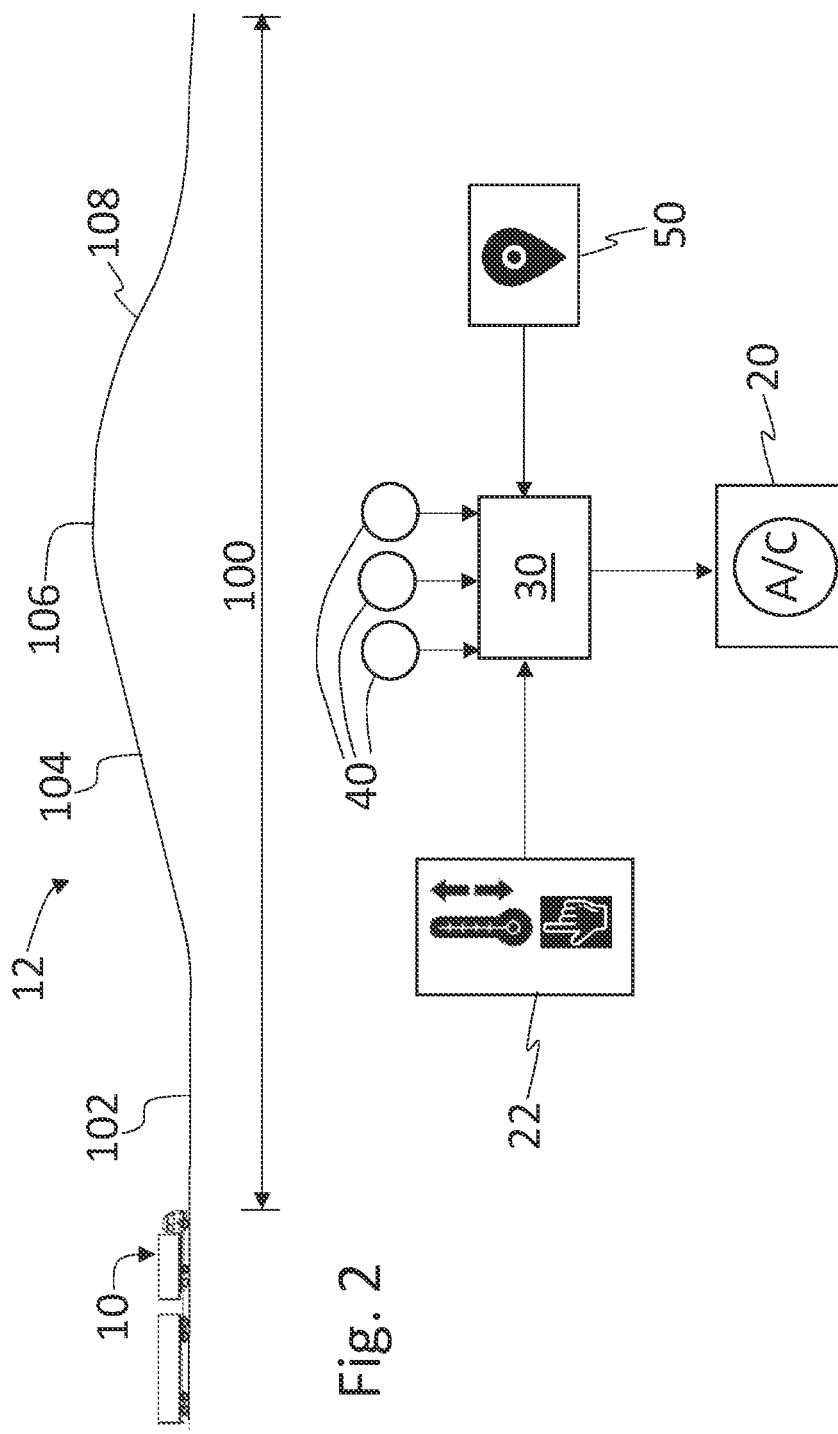

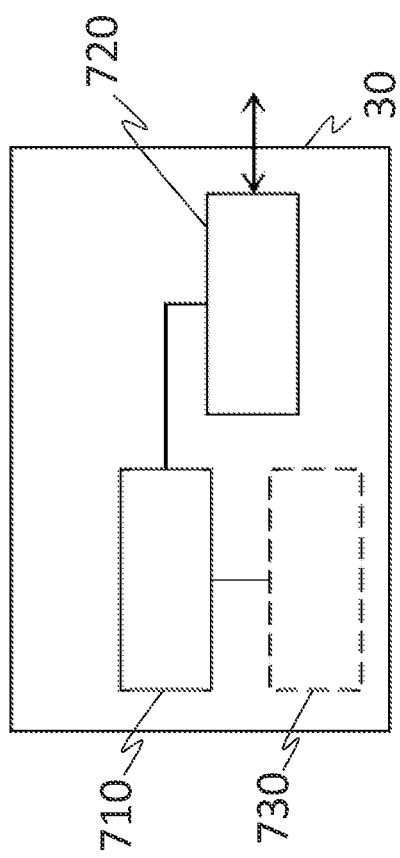
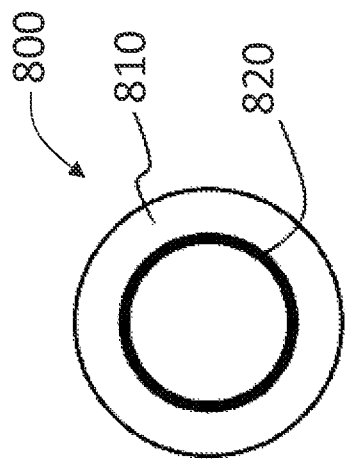
Fig. 7
Fig. 8

COMPUTER-IMPLEMENTED METHOD OF CONTROLLING THE CABIN CLIMATE IN A VEHICLE TRAVELLING ON A ROAD

TECHNICAL FIELD

The present disclosure relates to a computer-implemented method of controlling the cabin climate in a vehicle travelling on a road. The present disclosure also relates to a computer program, to a computer readable medium and to a control unit for performing the method. The present disclosure further relates to a vehicle comprising such a control unit.

The general inventive concept can be applied in heavy-duty vehicles, such as trucks, buses and construction equipment. Although the general inventive concept will be described with respect to a heavy-duty vehicle, the general inventive concept is not restricted to this particular vehicle, but may also be used in other vehicles such as cars.

BACKGROUND

Cabin climate control by means of an air-conditioning (AC) system is commonly used in vehicles. An air conditioning system has various components, including a flow creating device, such as a compressor that functions as a circulating pump. Operation of a compressor is energy consuming. Some automobile manufacturers have programed the AC compressor to be turned off during hard acceleration, since for such an event the propulsion system of the vehicle is prioritized when it comes to allocation of available energy. When it comes to heavy-duty vehicles, considering the heavy weight of the vehicle that the propulsion system is supposed to propel effectively, a prioritization of the energy allocation under certain driving conditions may indeed be appropriate in order for the propulsion system to meet the expectancies of the drivers. Although it is conceivable to implement also for a heavy-duty vehicle the above mentioned control strategy of simply turning off the AC compressor upon detection that the heavy-duty vehicle is performing a hard acceleration, there is still room for improvement.

SUMMARY

An object of the invention is to provide a method which at least partly provides an improvement compared to the control strategy discussed above, in particular for heavy-duty vehicles (although the improvement may be implementable also for other types of vehicles). This and other objects, which will become apparent in the following discussion, are achieved by a computer-implemented method as defined in the accompanying independent claim 1. Some non-limiting exemplary embodiments are presented in the dependent claims.

The inventors of the general inventive concept have realized that by predicting a driving scenario for an upcoming road segment, a flow creating device of an air-conditioning system may be controlled in an energy efficient manner.

According to at least a first aspect of the present disclosure, there is provided a computer-implemented method of controlling the cabin climate in a vehicle travelling on a road, the method comprising:

- detecting a requested temperature value of a desired temperature for at least one part of the cabin,
- determining an allowable temperature deviation from the requested temperature value,
- acquiring topographic data representative of the topography of an upcoming road segment, and
- controlling a flow creating device of an air-conditioning system of the vehicle based on the acquired topographic data so as to maintain the temperature within the allowable deviation.

As mentioned above, by controlling the flow creating device based on look-ahead information, an energy efficient control may be achieved. In particular, by realizing that different road topographies may call for different driving scenarios which in turn affects the energy needs of the propulsion system of the vehicle, the controlling of the flow creating device may be adapted accordingly.

The topographic data may suitably be obtained by a GPS system or a similar positioning system of the vehicle. As an example, the acquired data may cover several kilometres of the upcoming road, such as 3-5 kilometres. Thus, the acquired topographic data will in each instance normally include topographic data for a limited length of the road as a whole, i.e. the topographic data will include information about an upcoming road segment. Suitably, as the vehicle travels on that road segment, new topographic data may be acquired, for a new upcoming road segment. The new upcoming road segment may at least partly overlap the previous road segment. Thus, it should be understood that the step of acquiring topographic data may be performed repeatedly, either continuously or at certain time intervals (for example every second).

The topographic data may suitably be acquired by a control unit which may be operatively connected to the positioning system of the vehicle. Thus, the control unit may acquire the topographic data by means of the positioning system.

As will be readily understood, the upcoming road segment covered by the acquired topographic data may have varying topography. For instance, one or more parts of the upcoming road segment may be uphill, one or more parts may be downhill, and one or more parts may be substantially flat. Such different topographies may call for different driving scenarios. For example, in case of an uphill part of the road segment, it may be predicted that the propulsion system will need increased allocation of available energy, wherein the flow creating device may be shut off before reaching the uphill part. In some cases, in such a scenario it may be anticipated that shutting off the flow creating device will lead to the temperature reaching a value outside the allowable deviation. Therefore, before shutting off the flow creating device (in the above example, before reaching the uphill part), the flow creating device may temporarily be boosted, provided with increased energy, in order to counteract the unwanted temperature change that would otherwise occur. A similar example is when the vehicle is travelling downhill towards a bottom of the road before it goes uphill. In the downhill part of the road, the vehicle may suitably be subjected to regenerative braking, at least some of the regenerated energy may suitably be used for powering the flow creating device during the downhill travel (other energy source may also be used for powering the flow creating device). When the vehicle reaches the bottom or just before the uphill part, the flow creating device may be switched of in anticipation of the prioritized energy allocation to the propulsion system. Thus, the flow-creating device may be used to pre-cool the cabin of the vehicle during downhill travel (assuming the AC is in a cooling mode, or pre-heat in a heating mode). Another example is during crest roll, in which case engagement of the flow creating device or a request for engagement of the flow creating device may be delayed until the vehicle has travelled over the crest.

It should be understood that, although the flow creating device may suitably be a compressor, the general inventive concept is not limited to such an implementation. Other examples of conceivable flow creating devices are, for instance, a fan or a blower.

It should furthermore be understood that a cabin in the vehicle may define quite a large volume. Thus, there may be a certain degree of temperature variation throughout the cabin. For instance, the temperature near the floor may be different from the temperature higher up, such as at the level of an average driver's head. Therefore, the requested temperature value and the determination of the allowable temperature deviation may be limited to a certain part of the cabin, although the general inventive concept also encompasses that the temperature is considered for more than one part of the cabin, even for the entire cabin. The requested temperature may, suitably be received from a user interface, via which a person may set a desired temperature for one or more parts of the cabin (or different desired temperatures for different parts of the cabin), as is well known.

The determination of the allowable temperature deviation may be implemented in various ways. In some exemplary embodiments, the allowable temperature deviation may be a fixed deviation (in absolute degrees) irrespective of the requested temperature value. The allowable deviation may be the same above and below the requested temperature value, or the allowable deviation may be different above the requested temperature value compared to below the requested temperature value. In other exemplary embodiments, the allowable temperature deviation may be adapted to the requested temperature value. In at least some exemplary embodiments the allowable temperature deviation may be determined based on the ambient humidity. For instance, the allowable temperature deviation may be larger for lower humidity than for higher humidity (since temperature changes are more perceivable in high humidity and less so in low humidity).

It should also be understood that the general inventive concept may be implemented for a cooling mode as well as for a heating mode of the air-conditioning system.

Furthermore, it should be understood that the general inventive concept may be implemented in connection with different kinds of propulsion systems of vehicles. For instance, the computer-implemented method disclosed herein may be implemented for in connection with an internal combustion engine, an electric machine, a fuel cell electric vehicles, hybrids, etc.

As understood from previous discussion in this disclosure, according to at least one exemplary embodiment, the method comprises:

continuously or periodically acquiring new topographic data representative of the topography of new upcoming road segments.

By obtaining fresh look-ahead information a more efficient control of the flow creating device is achievable. Thus, the determination of when to shut off or turn on the flow creating device, or when to increase or decrease the power to the flow creating device, may suitably be continuously re-evaluated such that the temperature is maintained within the allowable temperature deviation in an energy efficient manner for the vehicle.

According to at least one exemplary embodiment, the method comprises:

determining the propulsion power that is currently needed for propelling the vehicle for a current torque request, and controlling the flow creating device based on the determined currently needed propulsion power.

By taking the currently needed propulsion power into account when controlling the flow creating device, an even more energy efficient controlling of the flow creating device may be enabled. Thus, in addition to the predictive control based on look-ahead information, the current need may be an additional factor in the control strategy. Nevertheless, the main focus of this disclosure is related to the predictive aspects of the controlling of the flow creating device. This will be discussed more in detail in connection with some exemplary embodiments presented below.

According to at least one exemplary embodiment, the method comprises:

predicting, based on the acquired topographic data, the propulsion power that will be needed in an upcoming road segment, and controlling the flow creating device based on that prediction.

As understood from previous discussions in this disclosure, a change in power demand for the propulsion system may be anticipated by using the look-ahead information available from the acquired topographic data. An example of such a prediction may be that an uphill part of the upcoming road segment will require increased power to the propulsion system and therefore the flow creating device may be shut off in advance, or at least operated with reduced power. Thus, by reacting at an early stage the energy allocation in the vehicle may be performed in an efficient manner. Similarly, if it can be predicted that an acceleration of the vehicle is imminent the flow creating device may be shut off before the acceleration (or at least operated with reduced power). As already understood, these examples are applicable to vehicles in which the propulsion power is achieved by an internal combustion engine, an electric motor, a fuel cell engine, or a combination thereof, etc.

According to at least one exemplary embodiment, the method comprises:

determining, based on said prediction, that the flow creating device will be shut off during at least a part of the upcoming road segment, and temporarily increasing the powering of the flow creating device before shutting it off.

This is advantageous as depending on for how long the flow creating device is estimated to be in a shut-off state, the temperature in the cabin may change to a value which is outside the variable range. In anticipation to such an unwanted event, the powering of the flow creating device can be temporarily increased to avoid the event from happening. For instance, assuming the ambient temperature outside the vehicle is high, then a pre-cooling state may be activated in which the flow creating device is given extra power, for example so as to lower the temperature to the lower limit of the allowable temperature deviation. Hereby, when the flow creating device is shut off, even though the temperature will increase, the whole allowable temperature deviation range will be available for the increase (i.e. all the way from the lower limit to the upper limit), before it may be determined that the flow creating device should be switched back on.

According to at least one exemplary embodiment, the method is implemented in a vehicle propelled by an internal combustion engine system, the method comprising:

determining, based on the predicted power need of the internal combustion engine system, that the temperature in said at least one part of the cabin will reach a value outside the allowable temperature deviation if the flow creating device is shut off during said part of the upcoming road segment, and using an auxiliary power supply to temporarily power the flow creating device.

This is advantageous as the power supply used for powering the internal combustion engine system (for example powering of the pump of the coolant subsystem of the internal combustion engine system) will not be compromised. Conversely, you do not need to worry about maintaining a desired temperature in the cabin at the cost of reduced power to the internal combustion engine system. It should, however, be understood that this may be generalized to any propulsion system. Thus, according to at least one exemplary embodiment, the method comprises:

determining, based on the predicted power need of a propulsion system of the vehicle, that the temperature in said at least one part of the cabin will reach a value outside the allowable temperature deviation if the flow creating device is shutoff during said part of the upcoming road segment, and, using an auxiliary power supply to temporarily power the flow creating device.

According to at least one exemplary embodiment, the method comprises:

in an uphill road segment or during acceleration of the vehicle, shutting off the flow creating device, measuring the temperature for said at least one part of the cabin, and restarting the flow creating device when the value of the measured temperature is outside the allowable temperature deviation.

Thus, in this manner an energy efficient power allocation may be balanced with maintaining a comfortable cabin temperature. This is similarly reflected in the following predictive exemplary embodiment.

According to at least one exemplary embodiment, the method comprises:

before the vehicle reaches an uphill road segment or before acceleration of the vehicle, shutting off the flow creating device, when the vehicle has reached said uphill road segment or when the vehicle is accelerating, measuring the temperature for said at least one part of the cabin, and restarting the flow creating device when the value of the measured temperature is outside the allowable temperature deviation.

In this manner, an even more energy efficient power allocation may achieved while balancing it against maintaining a comfortable cabin temperature.

According to at least one exemplary embodiment, the method comprises:

selecting, based on the acquired topographic data, which one of the following powering modes that is to be used for powering the flow creating device during an upcoming road segment:
  i) electrical powering
  ii) mechanical powering
  iii) a combination of electrical and mechanical powering powering the flow creating device using the selected powering mode.

This is beneficial as a control unit may determine/calculate the optimal configuration for the upcoming road segment, or for a part of the upcoming road segment.

According to at least one exemplary embodiment, the method comprises:

measuring one or more temperature-affecting parameters that affect the power need of the propulsion system of the vehicle, controlling the flow creating device based on parameter values obtained by said measuring, wherein said one or more temperature-affecting parameters are selected from:
ambient temperature,
ambient humidity,
the vehicle speed,
the wind speed,
the weight of the vehicle.

As should be understood, the power need of the propulsion system may be affected by temperature-affecting parameters. The harder the engine/motor of a propulsion system needs to work the higher will the radiation heat from the engine/motor normally be. This may affect the temperature in the cabin which for heavy duty vehicles is oftentimes located above the motor/engine. Furthermore, propulsion systems normally include a cooling subsystem for cooling the motor/engine. Such a cooling subsystem needs to be powered. The power requirement for such a cooling subsystem will, inter alia, depend on at least some of the above-mentioned temperature-affecting parameters.

Taking into account the parameter values, an appropriate balancing may be made between the power need of the propulsion system and the climate comfort in the cabin.

The above mentioned temperature-affecting parameters may be measured by means of various sensors. For instance, the ambient temperature may be measured by a temperature sensor. The ambient humidity may be measured by a humidity sensor. In this connection it may be noted that the ambient humidity is temperature-affecting in a sense that the perceived temperature by the driver will normally differ when comparing relatively high humidity and relatively low humidity. The vehicle speed may be measured by a speed sensor. The wind speed may be measured by a wind sensor. The direction of the wind (e.g. tailwind or head-wind) affects how much power/energy the engine/motor needs, and thus the radiation heat from the engine/motor. The weight of the vehicle may be measured by a weight sensor. The weight of the vehicle affects the power/energy requirement of the propulsion system, which affects the temperature both in terms of shut-off flow creating device and radiation heat from the engine/motor.

As mentioned above, the humidity may affect a driver-perceived temperature. This is reflected in at least one exemplary embodiment, according to which the method comprises:

measuring the air humidity in the cabin, and
controlling the flow creating device based on the measured humidity.

This has the further advantage that fogging of the inside of the windshield may be efficiently counteracted.

According to a second aspect of the present disclosure there is provided a computer program comprising program code means for performing the steps of the method according to the first aspect, including any embodiment thereof. The advantages of the computer program of the second aspect are largely analogous to the advantages of the method of the first aspect, including any embodiment thereof.

According to a third aspect of the present disclosure, there is provided a computer readable medium carrying a computer program comprising program code means for performing the steps of the method according to the first aspect, including any embodiment thereof, when said program product is run on a computer. The advantages of the computer readable medium of the third aspect are largely analogous to the advantages of the method of the first aspect, including any embodiment thereof.

According to a fourth aspect of the present disclosure, there is provided a control unit for controlling the cabin climate in a vehicle, the control unit being configured to perform the steps of the method according to the first aspect, including any embodiment thereof. The advantages of the control unit of the fourth aspect are largely analogous to the advantages of the method of the first aspect, including any embodiment thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to a fifth aspect of the present disclosure, there is provided a vehicle comprising a control unit according to the fourth aspect, including any embodiment thereof. The advantages of the vehicle of the fifth aspect are largely analogous to the advantages of the control unit of the fourth aspect, including any embodiment thereof.

Generally, all terms used in the claims are to be interpreted according to their ordinary meaning in the technical field, unless explicitly defined otherwise herein. All references to "a/an/the part, element, apparatus, component, arrangement, device, means, step, etc." are to be interpreted openly as referring to at least one instance of the part, element, apparatus, component, arrangement, device, means, step, etc., unless explicitly stated otherwise. The steps of any method disclosed herein do not have to be performed in the exact order disclosed, unless explicitly stated. Further features of, and advantages with, the present inventive concept will become apparent when studying the appended claims and the following description. The skilled person realizes that different features of the present inventive concept may be combined to create embodiments other than those described in the following, without departing from the scope of the present inventive concept.

BRIEF DESCRIPTION OF THE DRAWINGS

With reference to the appended drawings, below follows a more detailed description of embodiments of the invention cited as examples.

In the drawings:

FIG. 2 illustrates schematically another vehicle in accordance with at least one exemplary embodiment of the present disclosure, wherein the vehicle is travelling on a road.

FIG. 3 illustrates schematically vehicle components that may be included when performing the computer-implemented method according to at least some exemplary embodiments of the present disclosure.

FIG. 7 schematically illustrates a control unit according to at least one exemplary embodiment of the present disclosure.

FIG. 8 schematically illustrates a computer program product according to at least one exemplary embodiment of the present disclosure.

DETAILED DESCRIPTION OF EXAMPLE EMBODIMENTS OF THE INVENTION

Figure 1:
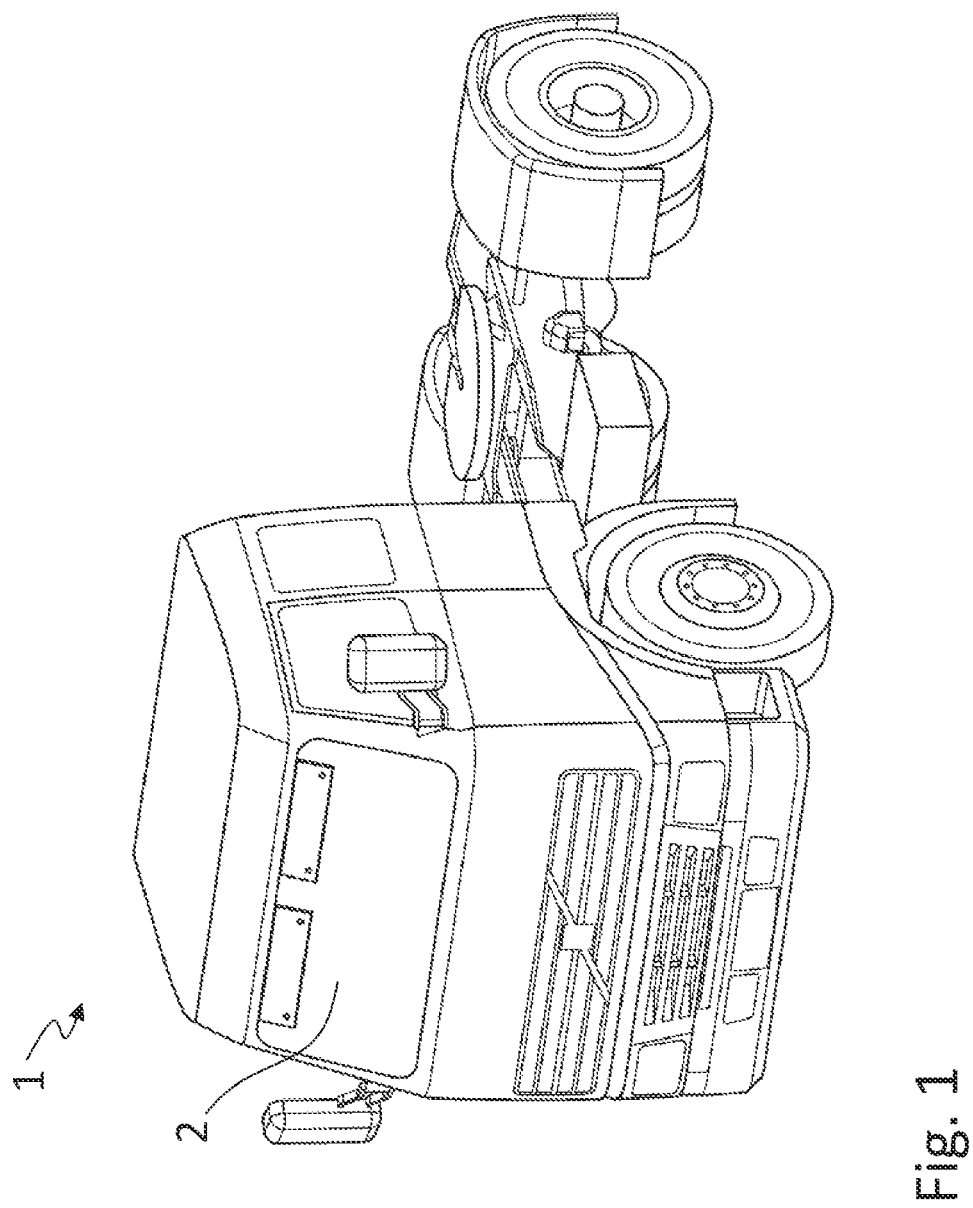
FIG. 1 illustrates schematically a vehicle in accordance with at least one exemplary embodiment of the present disclosure.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates schematically a vehicle 1 in accordance with at least one exemplary embodiment of the present disclosure. In this example, the vehicle 1 is a heavy-duty vehicle in the form of a tractor unit. The tractor unit is powered by a propulsion system, such as including an internal combustion engine, electric motor, fuel cell engine, or a combination thereof. Although a tractor unit has been illustrated, it should be understood that the teachings of the present disclosure may also be implemented in other types of vehicles powered, such as busses, construction equipment and passenger cars. The illustrated vehicle comprises a cabin 2 in which a driver may operate the vehicle.

FIG. 2 illustrates schematically another vehicle 10 in accordance with at least one exemplary embodiment of the present disclosure, wherein the vehicle 10 is travelling on a road 12. More specifically, the illustrated vehicle 10 is a heavy-duty vehicle combination which comprises a towing vehicle and a trailer which is towed by the towing vehicle. The towing vehicle is here illustrated in the form of a truck and the trailer is illustrated in the form of a full trailer. It should however be understood that in other exemplary embodiments the trailer may be a semi-trailer. It should further be understood that the general inventive concept is not limited to heavy-duty vehicle combinations, but may be implemented for single vehicles as well, such as for a single heavy-duty vehicle, for instance a truck, which does not necessarily need to have a trailer connected.

FIG. 3 illustrates schematically vehicle components that may be included when performing the computer-implemented method according to at least some exemplary embodiments of the present disclosure. A vehicle, such as the ones in FIG. 1 or 2, includes an air-conditioning system 20. The air-conditioning system 20 may be any conventional air-conditioning system, and may typically comprise components such as a compressor, a condenser, a fan, a dryer, an expansion valve, an evaporator and a blower. The vehicle may also comprise a user interface 22 such as a touch screen, control buttons, audio command interface, etc. via which a driver or passenger may request a certain temperature for one or more parts of the cabin, or for the entire cabin. The vehicle further comprises a control unit 30, which is operatively connected to the user interface 22 and may therefore be configured to detect a requested temperature value of a desired temperature for at least one part of the cabin (or as mentioned previously, for several parts of the cabin or for the entire cabin). The control unit 30 may, based on the detected requested temperature value, control the air-conditioning system 20 so as to substantially meet the requested temperature value. The vehicle may be equipped with a plurality of different sensors 40, including one or more temperature sensors for measuring the temperature in the cabin. Such temperature sensors may thus provide feedback to the control unit 30 so that the it can regulate the operation of the air-conditioning system 20 to arrive at the requested temperature value, or within an allowable temperature deviation from the requested temperature value.

The control unit 30 is configured to determine an allowable temperature deviation from the requested temperature value, this may be a fixed absolute range, a relative range, a dynamic range, etc., and it may be calculated by the control unit 30 itself, or it may be retrieved from an internal or external memory, look-up table, etc.

From the above, it should thus be understood that the control unit 30 is operatively connected to the air-conditioning system 20 and may control the air-conditioning system 20 so it is shut off during travel and turned back on again during travel. In particular, the control unit 30 may control a flow creating device (such as a compressor) of the air-conditioning system 20 to be shut off, switched on, provided with increased or decreased power, during the ongoing travel of the vehicle.

The vehicle may additionally comprise a positioning system 50, such as a GPS system. The control unit 30 may, by means of the positioning system 50, acquire topographic data representative of the topography of an upcoming road segment. In FIG. 2 such an upcoming road segment 100 has been indicated. The general inventive concept is not limited to a particular length of such an upcoming road segment 100, but as an illustrative example, it may typically be a couple of kilometres. However, longer or shorter settings of upcoming road segments may be conceivable without departing from the general idea of this disclosure. As illustrated in FIG. 2 an upcoming road segment 100 may include a number of different parts, which may be associated with different driving scenarios. In FIG. 2, the vehicle is currently travelling on a substantially flat part 102, but will soon reach an uphill part 104, then a crest 106, and the a downhill part 108. Although FIG. 2 illustrates different parts 102, 104, 106, 108 of the upcoming road segments 100, there may of course be cases when the upcoming road segment (for which topographic data has been acquired by the control unit 30) will have much less variation, such as for instance a long, straight and substantially flat upcoming road segment. Thus, it will be understood that the control unit 30 will repeatedly be acquiring new topographic data as the vehicle 10 progresses along the road 12, wherein new topographic data representative of a new upcoming road segment may at least partly overlap with the previously acquired data (previous upcoming road segment 100). This acquiring of topographic data may, for instance, be performed in a continuous manner or periodically at certain time intervals. Furthermore, the acquiring of topographic data may be performed irrespectively of if the flow creating device of the air-conditioning system 20 is shut off or is turned on.

The control unit 30 controls the flow creating device of the air-conditioning system 20 based on the acquired topographic data so as to maintain the temperature in the cabin within the allowable deviation. In particular, the control unit 30 may, based on the acquired topographic data, predict a driving scenario for at least a part of the upcoming road segment 100. For instance, in the example illustrated in FIG. 2, the control unit 30 may predict that the propulsion system of the vehicle 10 will need to be allocated more powered in order for the vehicle 10 to effectively drive in the uphill part 104 of the upcoming road segment 100. In order to maintain the temperature in the cabin within the allowable temperature deviation, the control unit may, for instance, during the flat part 102 temporarily increase the powering of the flow creating device and then, when reaching the uphill part 104, decrease the powering of the flow creating device or shutting off the flow creating device, thereby enabling sufficient power to be allocated to the propulsion system of the vehicle 10. Thus, by means of this predictive control strategy, an anticipated change of cabin temperature (due to an anticipated reduced powering or shutting off of the flow creating device, because of the anticipated power need of the propulsion system) can be managed in an efficient manner reducing the risk of the temperature reaching outside the allowable temperature deviation, while allowing appropriate allocation of the available energy to the propulsion system. Put differently, in this example the control unit may control the air-conditioning system to "pre-cool" (in cooling mode) or "pre-heat" (in heating mode) before shutting off (or at least reducing the power to) the flow creating device.

From the above, it should be understood that, in at least some exemplary embodiments, based on the acquired topographic data the control unit 30 may predict a power need of the propulsion system (e.g. a predicted power need of an internal combustion engine system of the vehicle), as in the above example where an increased power need is predicted for the uphill part 104. It should be understood that other factors may also be taken into account by the control unit when predicting the power need. Examples of such other factors are the weight of the vehicle, the wind direction, the wind speed, etc. However, other factors such as ambient temperature and vehicle speed may also affect the power need of the propulsion system. The control unit 30 may determine that the temperature in said at least one part of the cabin will reach a value outside the allowable temperature deviation if the flow creating device is shut off during said part of the upcoming road segment (e.g. if the uphill part 104 is long, and will thus take a certain time to travel, during which time the temperature in the cabin is likely to fall or rise to a temperature outside the allowable temperature deviation). The control unit may then activate an auxiliary power supply to temporarily power the flow creating device and thereby reducing the risk of the temperature reaching a value outside the allowable temperature deviation.

In the above example, when the vehicle 10 has passed over the crest 106, the control unit 30 may suitably turn on/increase the power to the flow creating device of the air-conditioning system 20. From the above it should thus be understood that there are various conceivable driving scenarios in which the computer-implemented method of the present disclosure may be implemented, e.g. by means of the control unit 30.

It should be understood that in addition to a predictive control strategy which may take into account an anticipated power need of the propulsion system, the control unit 30 may additionally take into account propulsion power that is currently needed for propelling the vehicle for a current torque request. The control unit 30 may thus control the flow creating device of the air-conditioning system 20 based on the determined currently needed propulsion power. For instance, in the previous example, the control unit 30 may predictively determine that the uphill part 104, will require the flow creating device to be shut off, but the control unit 30 may note that when the vehicle 10 reaches the crest 106 the propulsion power needed at the crest 106 is less than during the uphill part 104, and may accordingly adapt the power to the flow creating device. Thus, in at least some exemplary embodiments, the method may include both predictive and reactive control of the flow creating device of the air-conditioning system 20. In other words, the control unit 30 may be configured to predict, based on the acquired topographic data, the propulsion power that will be needed in an upcoming road segment, and to control the flow creating device based on that prediction, and the control unit 30 may additionally be configured to determine the propulsion power that is currently needed for propelling the vehicle for a current torque request, and to control the flow creating device based on the determined currently needed propulsion power.

Figure 6:
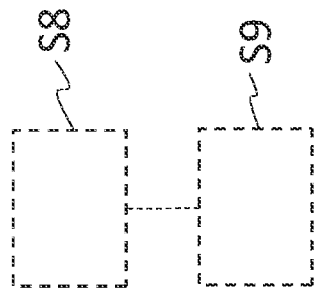
FIG. 6 illustrates schematically a computer-implemented method in accordance with yet another exemplary embodiment of the present disclosure.
Figure 5:
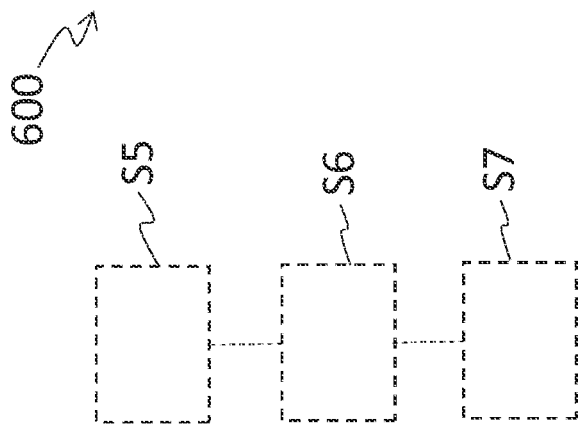
FIG. 5 illustrates schematically a computer-implemented method in accordance with at least another exemplary embodiment of the present disclosure.
Figure 4:
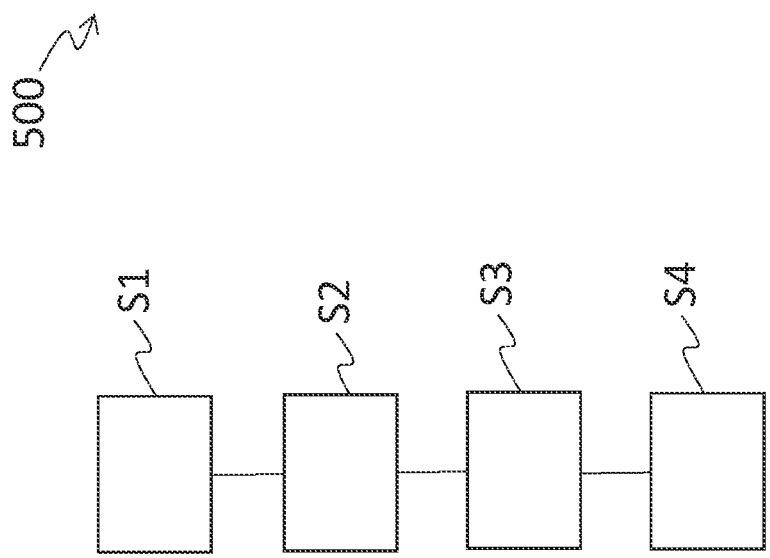
FIG. 4 illustrates schematically a computer-implemented method in accordance with at least one exemplary embodiment of the present disclosure.

Turning now to the schematic charts in FIGS. 4-6, some different steps of non-limiting exemplary embodiments of the computer-implemented method of the present disclosure are illustrated. The computer-implemented method may suitably be performed by means of one or more control units, such as the control unit 30 illustrated in FIG. 3 or FIG. 7.

FIG. 4 illustrates schematically a computer-implemented method 400 in accordance with at least one exemplary embodiment of the present disclosure. More specifically, FIG. 4 illustrates a computer-implemented method 400 of controlling the cabin climate in a vehicle travelling on a road, comprising:
- in a step S1, detecting a requested temperature value of a desired temperature for at least one part of the cabin,
- in a step S2, determining an allowable temperature deviation from the requested temperature value,
- in a step S3, acquiring topographic data representative of the topography of an upcoming road segment, and
- in a step S4, controlling a flow creating device of an air-conditioning system of the vehicle based on the acquired topographic data so as to maintain the temperature within the allowable deviation.

It should be understood that the steps S1-S4 do not necessarily need to be performed in the listed order. For example, step S3 may be performed continuously or repeatedly and topographic data may thus be acquired before detecting a requested temperature value in step S1. This may, for example, be the case if the driver has actively shut off the air-conditioning system and then later decided to switch it on and therefore decides on a desired temperature which he/she conveys to the control unit as a requested temperature value via the user interface.

FIG. 5 illustrates schematically a computer-implemented method 500 in accordance with at least another exemplary embodiment of the present disclosure. This exemplary embodiment may include all the steps S1-S4 of the method 400 and additionally include the illustrated steps S5-S7. Thus, the method 500 may comprise:
- in a step S5, before the vehicle reaches an uphill road segment or before acceleration of the vehicle, shutting off the flow creating device,
- in a step S6, when the vehicle has reached said uphill road segment or when the vehicle is accelerating, measuring the temperature for said at least one part of the cabin, and
- in a step S7, restarting the flow creating device when the value of the measured temperature is outside the allowable temperature deviation.

This method 500 thus predictively takes into account an uphill road segment, as in the example in FIG. 2, but also takes into account an upcoming acceleration. For instance, if the control unit 30 determines that the vehicle is about to change lanes to a fast lane, indicative of an overtaking manoeuvre, the flow creating device may be timely shut off, so as to allocate the required energy to the propulsion system.

In an alternative interpretation of FIG. 5, instead of the anticipatory shutting off in step S5, the step S5 may comprise: in an uphill road segment or during acceleration of the vehicle, shutting off the flow creating device. As a consequence, step S6 may comprise:
- measuring the temperature for said at least one part of the cabin. Step S7 may remain the same as in the first interpretation of FIG. 5.

FIG. 6 illustrates schematically a computer-implemented method 600 in accordance with yet another exemplary embodiment of the present disclosure. This exemplary embodiment may include all the steps S1-S4 of the method 400, and additionally include the illustrated steps S8-S9. Furthermore, the method 600 may additionally include the steps S5-S7 of method 500. Thus, the method 600 may comprise:
- in a step S8, selecting, based on the acquired topographic data, which one of the following powering modes that is to be used for powering the flow creating device during an upcoming road segment:
  i) electrical powering
  ii) mechanical powering
  iii) a combination of electrical and mechanical powering
- in a step S9, powering the flow creating device using the selected powering mode.

Thus, the method 600 may be implemented in a vehicle having at least a mechanical and an electrical powering mode. The mechanical powering may be achieved by means of an internal combustion engine, while the electric powering may suitably be achieved by and electric motor/generator, an auxiliary battery, etc.

As mentioned previously in this disclosure, the computer-implemented method, such as the methods 400, 500, 600 illustrated in FIGS. 4-6, may comprise:
- measuring one or more temperature-affecting parameters that also affect the power need of the propulsion system of the vehicle,
- controlling the flow creating device based on parameter values obtained by said measuring,
- wherein said one or more temperature-affecting parameters are selected from:
  ambient temperature,
  ambient humidity,
  the vehicle speed,
  the wind speed,
  the weight of the vehicle.

The computer-implemented method, such as the methods 400, 500, 600 illustrated in FIGS. 4-6, may also comprise:
measuring the air humidity in the cabin, and
controlling the flow creating device based on the measured humidity.

The measurement of the above exemplified parameters may suitably be performed by respective sensors, such as the exemplified sensors 40 in FIG. 3, which may convey the measurement results to the control unit 30 for evaluation/analysis.

FIG. 7 schematically illustrates a control unit 30 according to at least one exemplary embodiment of the present disclosure. In particular, FIG. 7 illustrates, in terms of a number of functional units, the components of a control unit 30 according to exemplary embodiments of the discussions herein. The control unit 30 may be comprised in any vehicle disclosed herein, such as the ones illustrated in FIGS. 1 and 2, and others discussed above. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 30 to perform a set of operations, or steps, such as the method discussed in connection to FIG. 4, FIG. 5 and/or FIG. 6 and exemplary embodiments thereof discussed throughout this disclosure. For example, the storage medium 730 may store the set of operations, and the processing circuitry 710 may be configured to retrieve the set of operations from the storage medium 730 to cause the control unit 30 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit 30 may further comprise an interface 720 for communications with at least one external device such as the positioning system 50, the sensors 40, the user interface 22, and the air-conditioning system 20 discussed herein. As such, the interface 720 may comprise one or more transmitters and receivers, comprising analogue and digital components and a suitable number of ports for wireline or wireless communication.

The processing circuitry 710 controls the general operation of the control unit 30, e.g. by sending data and control signals to the interface 720 and the storage medium 730, by receiving data and reports from the interface 720, and by retrieving data and instructions form the storage medium 730. Other components, as well as the related functionality, of the control unit 30 are omitted in order not to obscure the concepts presented herein.

FIG. 8 schematically illustrates a computer program product 800 according to at least one exemplary embodiment of the present disclosure. More specifically, FIG. 8 illustrates a computer readable medium 810 carrying a computer program comprising program code means 820 for performing the methods exemplified in FIG. 4, FIG. 5 and/or FIG. 6, when said program product is run on a computer. The computer readable medium 810 and the program code means 820 may together form the computer program product 800.

The invention claimed is:

1. A computer-implemented method of controlling the cabin climate in a vehicle travelling on a road, the method comprising:
   detecting a requested temperature value of a desired temperature for at least one part of the cabin,
   determining an allowable temperature deviation from the requested temperature value,
   acquiring topographic data representative of the topography of an upcoming road segment,
   controlling a flow creating device of an air-conditioning system of the vehicle based on the acquired topographic data so as to maintain the temperature within the allowable deviation,
   predicting, based on the acquired topographic data, a propulsion power that will be needed in an upcoming road segment,
   controlling the flow creating device based on that prediction,
   determining, based on said prediction, that the flow creating device will be shut off during at least a part of the upcoming road segment, and
   temporarily increasing the powering of the flow creating device before shutting it off.

2. The method according to claim 1, comprising:
   continuously or periodically acquiring new topographic data representative of the topography of new upcoming road segments.

3. The method according to claim 1, comprising:
   determining the propulsion power that is currently needed for propelling the vehicle for a current torque request, and
   controlling the flow creating device based on the determined currently needed propulsion power.

4. The method according to claim 1, wherein the method is implemented in a vehicle propelled by an internal combustion engine system, the method comprising:
   determining, based on the predicted power need of the internal combustion engine system, that the temperature in said at least one part of the cabin will reach a value outside the allowable temperature deviation if the flow creating device is shut off during said part of the upcoming road segment, and
   using an auxiliary power supply to temporarily power the flow creating device.

5. The method according to claim 1, comprising:
   in an uphill road segment or during acceleration of the vehicle, shutting off the flow creating device,
   measuring the temperature for said at least one part of the cabin, and
   restarting the flow creating device when the value of the measured temperature is outside the allowable temperature deviation.

6. The method according to claim 1, comprising:
   before the vehicle reaches an uphill road segment or before acceleration of the vehicle, shutting off the flow creating device,
   when the vehicle has reached said uphill road segment or when the vehicle is accelerating, measuring the temperature for said at least one part of the cabin, and
   restarting the flow creating device when the value of the measured temperature is outside the allowable temperature deviation.

7. The method according to claim 1, comprising:

selecting, based on the acquired topographic data, which one of the following powering modes that is to be used for powering the flow creating device during an upcoming road segment:
  i) electrical powering
  ii) mechanical powering
  iii) a combination of electrical and mechanical powering powering the flow creating device using the selected powering mode.

8. The method according to claim 1, comprising measuring one or more temperature-affecting parameters that also affect the power need of the propulsion system of the vehicle, controlling the flow creating device based on parameter values obtained by said measuring, wherein said one or more temperature-affecting parameters are selected from:

ambient temperature,
ambient humidity,
the vehicle speed,
the wind speed,
the weight of the vehicle.

9. The method according to claim 1, comprising:
measuring the air humidity in the cabin, and
controlling the flow creating device based on the measured humidity.

10. A non-transitory computer readable medium carrying a computer program comprising program code for performing the method according to claim 1 when said program code is run on a computer.

11. A control unit for controlling the cabin climate in a vehicle, the control unit being configured to perform the the method according to claim 1.

12. A vehicle comprising a control unit according to claim 11.

13. The method according to claim 1, wherein the flow creating device comprises a compressor.

* * * * *